(No Model.)
J. R. MELONEY.
TRUSS.
No. 396,414. Patented Jan. 22, 1889.
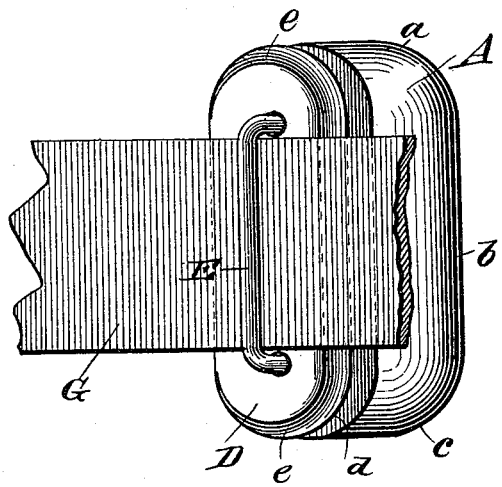
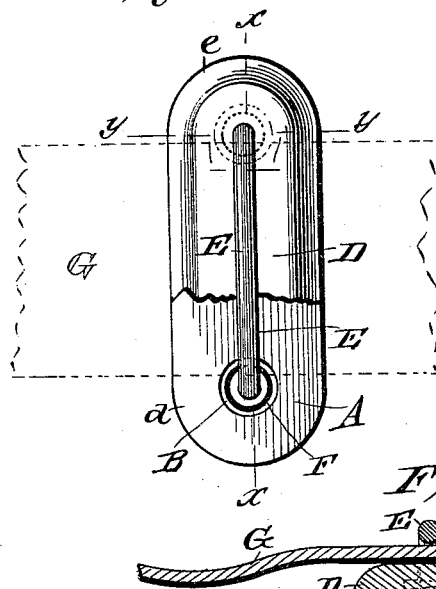
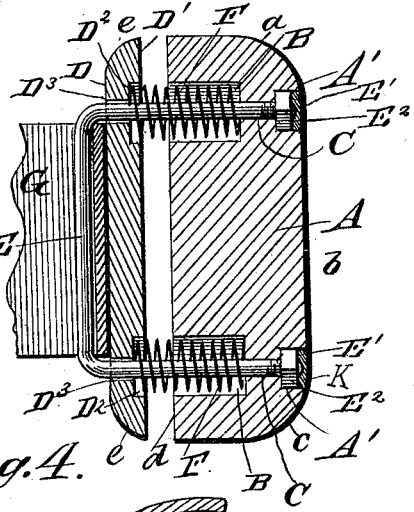
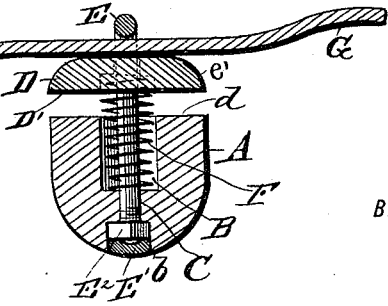
WITNESSES:
Phil. C. Dietrich.
C. Sedgwick.
INVENTOR:
J. R. Meloney
BY Munn & Co.
ATTORNEYS.

UNITED STATES PATENT OFFICE.

JOSEPH R. MELONEY, OF BLOOMER, WISCONSIN.

TRUSS.

SPECIFICATION forming part of Letters Patent No. 396,414, dated January 22, 1889.

Application filed June 28, 1888. Serial No. 278,393. (No model.)

*To all whom it may concern:*

Be it known that I, JOSEPH R. MELONEY, of Bloomer, in the county of Chippewa and State of Wisconsin, have invented a new and Improved Truss, of which the following is a full, clear, and exact description.

The object of my invention is to provide a neat, simple, and effective truss—one that will readily yield in conformity to the actions of the body or the parts with which it is brought into contact; and it consists in the parts which will be hereinafter described, and pointed out in the claim.

Reference is to be had to the accompanying drawings, forming a part of this specification, in which similar letters of reference indicate corresponding parts in all the figures.

Figure 1 represents a perspective view of the truss with a part of a belt or band connected therewith. Fig. 2 is a top plan view with a part of the head-block broken away, the band being shown in dotted lines. Fig. 3 is a section taken on the line $x\ x$ of Fig. 2, and Fig. 4 is a section taken on the line $y\ y$ of Fig. 2.

A represents an oblong base-block, which is rounded on its outer sides at $a\ b\ c$. The part $d$ of the block is flat. The flat side is provided with two recesses, B B.

C C are two openings, each of which communicates with the bottom of the recess B, and said openings also communicating with the outer side, $b$, of the block A. The outer side of each opening C is enlarged or countersunk at A'.

D indicates the head-block of the truss. This block is oblong, has a flat top, and is provided with rounded ends and sides $e\ e'$. The inner side, D', of this block is flat, and said inner side is provided with two recesses, $D^2$, which communicate with openings $D^3$.

E is a yoke-shaped rod provided with threaded ends E', and $E^2$ are nuts engaged on said threaded ends. The two arms of this rod lie parallel, and they are engaged in the openings C and recesses B, respectively, of the block A, and also engaged in the recesses and openings, respectively, in the head-block D.

F F are two spiral springs, each encircling one of the arms of the rod E.

G represents a belt or band, which is engaged between the outer part of the rod and the head-block D.

In connecting the parts, the spiral springs are each seated in the recesses in the blocks A D, as shown in Fig. 3. The arms of the yoke E are then passed through the openings in the blocks and through the spiral springs, and the nuts $E^2$ engaged to the threaded ends, respectively, of the arms. The nuts and yoke are then moved so as to seat said nuts in the countersunk part A' of the block A, and said countersunk part is then filled with suitable material, K, flush with the surface of the block A.

The spiral springs normally hold the two blocks apart, as shown in Figs. 3 and 4. The truss is held in position by the band G, or other suitable means. The part $b$ of the block A is applied to the affected part of the body, and said block, by means of the arms and springs, is capable of a varied movement, so as to yield in conformity to the movements of the body.

The blocks A D may be of wood or other suitable material.

Having thus described my invention, what I claim as new, and desire to secure by Letters Patent, is—

In a truss, the combination of a base-block and a head-block, each provided with two openings, the respective openings in one block being in alignment with the corresponding openings in the companion block, the inner part of each opening being recessed or enlarged, two spiral springs interposed between the blocks and seated in the respective aligning openings, as specified, a yoke-shaped rod having its side arms in the respective springs and openings aforesaid, the ends of said arms being secured to the base-block, the cross-piece of the yoke lying outside of the head-block, whereby the body-band may be secured between said cross-piece and head-block, substantially as specified.

JOSEPH R. MELONEY.

Witnesses:
   C. D. TILLINGHAST,
   HENRY MARSHALL.